Aug. 29, 1939.   J. R. McCOY   2,171,401
SPEED CONTROL MECHANISM FOR AUTOMOTIVE VEHICLES
Filed Sept. 10, 1937   2 Sheets-Sheet 1

Inventor
James R. McCoy.
By Cushman Darby Cushman
Attorneys

Aug. 29, 1939.   J. R. McCOY   2,171,401
SPEED CONTROL MECHANISM FOR AUTOMOTIVE VEHICLES
Filed Sept. 10, 1937   2 Sheets-Sheet 2
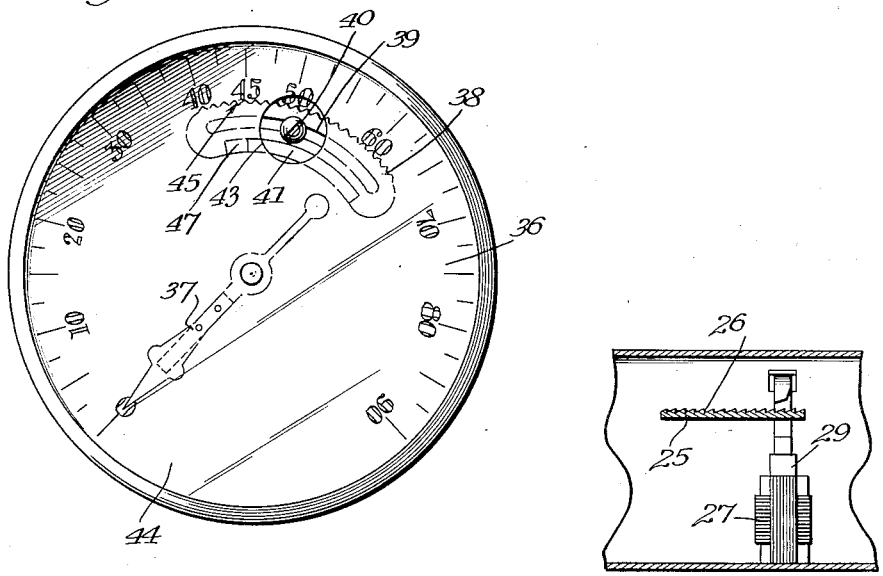
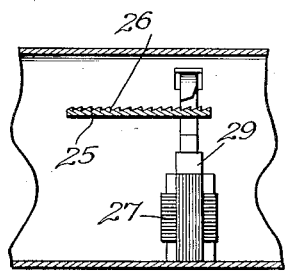
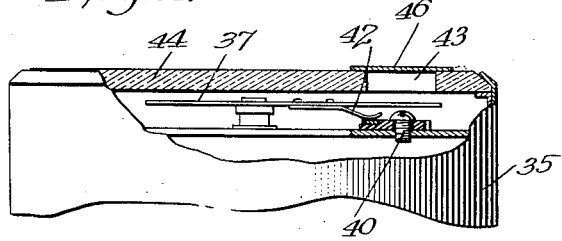
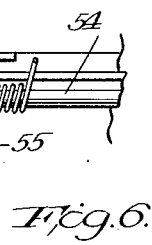
Inventor
James R. McCoy
By Cushman Darby & Cushman
Attorneys Patented Aug. 29, 1939

2,171,401

UNITED STATES PATENT OFFICE 2,171,401

SPEED CONTROL MECHANISM FOR AUTOMOTIVE VEHICLES

James Reynolds McCoy, Jersey City, N. J., assignor of three-fourths to William J. Bigley, Hoboken, N. J.

Application September 10, 1937, Serial No. 163,328

12 Claims. (Cl. 180—82)

The present invention relates to a speed control mechanism for motor vehicles.

An object of the invention is the provision of means which, upon a predetermined speed of the vehicle, will render certain mechanism inoperative so as to prevent the vehicle from traveling at a higher propelled speed.

In the present device, the controlling means is associated with the throttle valve and accelerator pedal of the vehicle and is adapted to control the operative connections between these two elements so as to limit or interrupt the operative effect of the accelerator pedal. More specifically, the controlling means is adapted to lock these operative connections and the accelerator pedal against any further valve opening movement until the speed of the vehicle has been retarded and drops below the point set as the maximum speed to which the vehicle is permitted to travel.

The present invention is constructed to permit the locking means to become effective at various predetermined speed limits depending upon the speed of the state in which the vehicle is operating. As an example of one means for effecting this control, I utilize the speedometer and provide an adjustable contact and electrical connections from the speedometer to the locking means whereby when the vehicle reaches the predetermined speed limit, the speedometer pointer will engage the contact, close the circuit and operate the locking means.

With the foregoing and other objects in view, the invention will now be more fully described, reference being had to the accompanying drawings, in which Figure 1 discloses one form of the invention showing the connections between the accelerator, throttle valve, speedometer and locking solenoid;

Figure 3 is an enlarged view of a speedometer dial showing the adjustable contact plate;

Figure 4 is a side elevation of a speedometer casing partly broken away showing the arrangement of the contact plate and pointer arm;

Figure 5 is a detail of the locking arrangement between the solenoid and the segmental plate, and Figure 6 is a detail showing a modified form of the invention.

Figure 1:
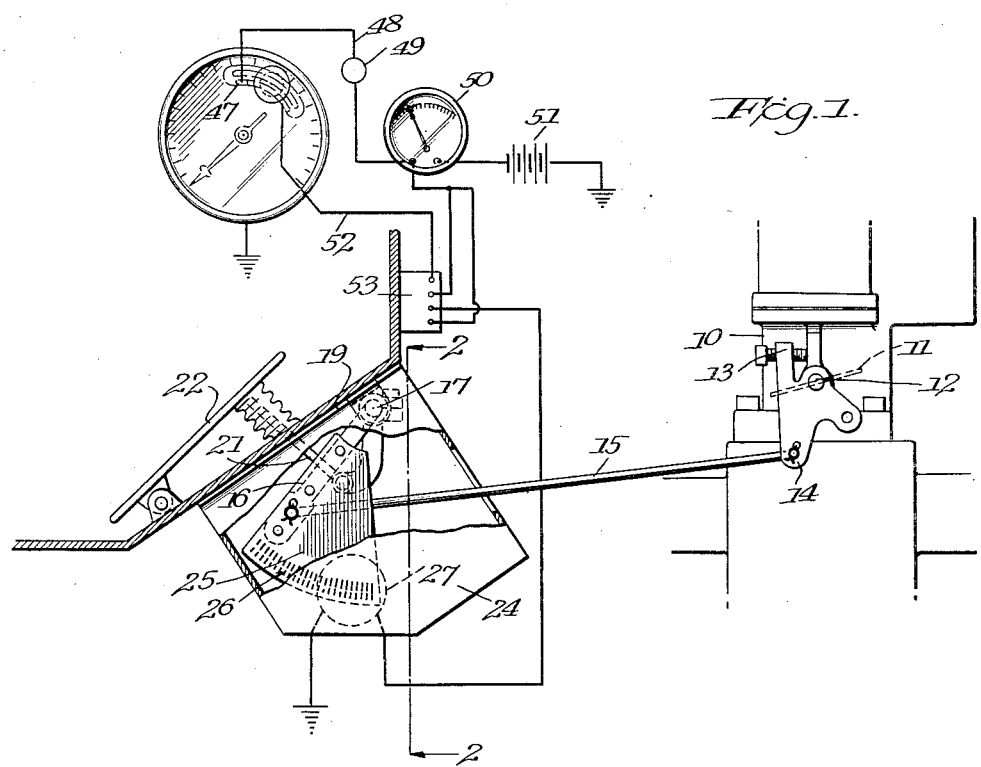
Figure 2:
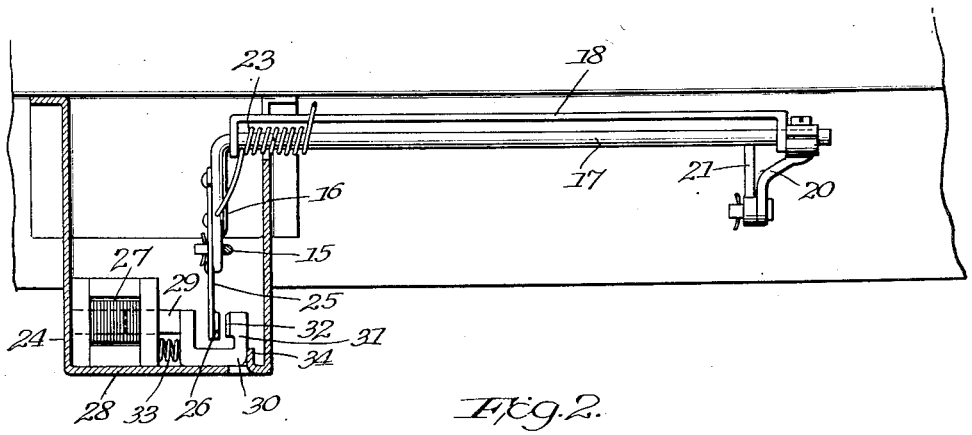
Figure 2 is a section taken on line 2—2 of Figure 1.

Referring now to Figures 1 and 2 of the drawings, the numeral 10 designates an inlet passage leading to the intake manifold of an internal combustion engine, or it may constitute a portion of the intake manifold itself, depending on the type of motor. A throttle valve 11 is pivotally mounted in the passage for controlling the flow of fuel to the engine. A lever 12 is mounted on the valve shaft exteriorly of the manifold and is provided with an adjustable stop 13 for limiting the closing movement of the valve. The lever is provided with a depending arm 14 to which is pivotally connected one end of an operating rod 15. The other end of this rod is pivotally attached to an arm 16 of a rock shaft 17 which is mounted in bracket 18 carried by the underside of the floor board 19 of the motor vehicle.

An arm 20 is adjustably mounted on the opposite end of the rock shaft from the arm 16 and is pivotally connected to a link 21 which in turn is attached directly to the accelerator pedal 22 of the vehicle. This pedal is pivotally mounted on the floor board 19 in the usual manner. In fact all of the structure thus far described may form the usual elements which permit actuation of the throttle valve by depressing the accelerator pedal. This particular structure is illustrated however, as it is capable of being readily used in combination with my speed control mechanism. It is to be understood however, that my invention is not limited in use to this arrangement, but is capable of application to various constructions connecting the accelerator to the throttle valve.

With the present construction, upon operation of the accelerator pedal 22, the rock shaft 17 is rotated in the bracket 18 and through the rod 15 actuates the lever 12 which in turn opens the throttle valve 11. When the foot of the operator releases the pedal 22 the latter is raised and the throttle valve returned to idling position by reason of the coil spring 23 mounted on the rock shaft 17 and having one end engaging the arm 16.

The arm 16 and a portion of the rock shaft are enclosed within a box-like casing 24 which also houses the means for locking the accelerator pedal against downward movement, thus preventing a further opening movement of the throttle valve when the vehicle reaches a predetermined speed. This locking device comprises a segmental plate 25 mounted on the arm 16 and provided adjacent its free end with a plurality of ratchet teeth or notches 26. A solenoid 27 is mounted upon the bottom wall 28 of the casing 24 and has a core 29. The outer end of this core is U-shaped in formation as at 30 and this is in the path of and straddles the free end of the segmental plate 25. The outer leg 31 of the U-shaped portion 30 is sharpened or tapered as at 32 and is so positioned as to register with the ratchet teeth 26 of the segmental plate.

As clearly shown in Figure 2, a coil spring 33 normally urges the core 29 against the stop 34 and out of engagement with the ratchet teeth 26 when the solenoid is deenergized. When however, the solenoid is energized, such as when its circuit is closed when a predetermined speed of the vehicle is reached, the core will immediately move to the left against the tension of the spring 33. This will have the effect of moving the sharpened portion 32 of the core into engagement with one of the ratchet teeth 26, thus positively locking the plate against movement in the direction which would permit further opening of the throttle valve 11. By reason of the connections between the segmental plate 25 and the accelerator pedal 22, the latter is also locked against further downward movement and thus the operator is prevented from opening the throttle valve any further. When the operator removes foot pressure from the pedal 22 however, the spring 23 will be sufficiently strong to move the arm 16 and the segmental plate 25 to the left in Figure 1, permitting the teeth 26 to slide over the sharpened end of the core and move the throttle valve to idling position.

Any suitable means may be employed for closing the solenoid circuit when the vehicle reaches a predetermined speed and in the present instance I have modified the usual speedometer structure to permit this operation.

Referring to Figures 3 and 4, the numeral 35 designates a speedometer casing provided with a dial 36 and a rotatable pointer 37. At any desired position below the speed indicating numerals, there is mounted an arcuate contact plate 38. As shown in Figure 3, this plate is located at a point between the numerals indicating a speed of from 40 to 65 miles on the speedometer dial. The plate is provided with a slot 39 which receives a set screw 40. With this arrangement, the contact plate may be moved to various positions with respect to the speed indicating numerals and then retained in the desired location by tightening the screw 40. The entire plate may be insulated from the dial 36 but as shown in the drawings, I provide a non-metallic plate upon which is mounted a metallic strip 41. A spring arm or wiper 42 secured to the underside of the pointer 37 is adapted to engage the strip 41, when the pointer reaches a predetermined speed (45 miles per hour as shown in Figure 3).

The contact plate 38 is adapted to be set and sealed in position by the State authorities or other official body so as to prevent unauthorized adjustment of the same. This is accomplished by forming an opening 43 in the glass cover 44 in alignment with the screw 40. The plate 38 is provided with a roughened or serrated edge 45 whereby upon the insertion of a screw driver or other tool, the plate may be moved to any desired position and then locked against further movement when the screw is tightened. Thereafter a seal 46 is applied over the opening 43 so that the contact plate may not be moved or tampered with after the proper authorities have sealed it in the proper position.

Any suitable circuit may be employed to connect the solenoid with the speedometer casing and as one example, I utilize the arrangement shown in Figure 1 of the drawings. In this connection I provide an initial contact 47 which through the wiring 48 energizes a buzzer or light 49 constituting a signal to indicate to the driver that the vehicle has reached the authorized speed limit to which the contact plate has been set and that any higher speed will actuate the mechanism for locking the accelerator pedal. The circuit 48 includes the ammeter 50 and the battery 51. If the speed is increased, the spring arm 42 will immediately move from the contact 47 onto the contact strip 41 and thus close the circuit 52 to the solenoid 27, which operates the core 29 and locks the plate 25 against any further valve opening movement. The wiring of the circuit 52 may lead directly to the solenoid 27, but in the present instance I employ a relay 53 for the purpose of producing a stronger current to the solenoid. The relay 53 and the circuits leading therefrom to the speedometer casing, the ammeter and the solenoid are of the usual type and are therefore not described in detail, since it is obvious that upon closing of the circuit 52, the relay will produce a relatively stronger current passing to the solenoid 27.

Referring to Figure 6, there is disclosed a modified form of the invention wherein the segmental plate and solenoid are reversed with respect to the showing in Figures 1 and 2. In this modified arrangement the rock shaft 54 is provided with an arm 55 upon the lower end of which is mounted a solenoid 56. The core 57 is sharpened or pointed similar to the core 29 and is adapted upon rocking movement of the shaft 54, to move in the path of the stationary plate 58. This plate is mounted on the bottom wall 59 of the casing 60 and is provided with a plurality of ratchet teeth 61. Upon energization of the solenoid 56 the end of the core 57 moves outwardly and thus locks the rock arm against valve opening movement. This in turn, locks the accelerator pedal (not shown) in a manner similar to that described above. This arrangement is practical and efficient and may be employed as desired, although the structure shown in Figures 1 and 2 is the preferred form of my invention.

Such variation from the construction herein shown and described as are within the skill of a mechanic, may, of course, be made without departing from the range of my invention.

I claim—

1. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, comprising pedal locking means including a plate and a solenoid having a movable core associated with said plate, one of said last mentioned elements being carried by said operating mechanism, and means operable upon a predetermined speed of the vehicle to energize the solenoid and move the core into locking engagement with the plate.

2. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, comprising pedal locking means including a plate carried by said operating mechanism and a solenoid having a core located in the path of the plate, and means operable upon a predetermined speed of the vehicle to energize the solenoid and move the core into locking engagement with the plate.

3. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, comprising pedal locking means including a solenoid having a core carried by said operating mechanism and a plate mounted on the vehicle in the path of the solenoid, and means operable upon a predetermined speed of the vehicle to energize the solenoid and move the core into locking engagement with the plate.

4. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, comprising pedal locking means including a solenoid having a core provided at one end with a sharpened edge and a plate having a plurality of ratchet teeth engageable with the shapened edge of the core to lock the plate against valve opening movement, and means operable upon a predetermined speed of the vehicle to energize the solenoid and move the core into locking engagement with the plate.

5. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, comprising pedal locking means including a plate carried by said operating mechanism and a solenoid having a core provided with a substantially U-shaped portion straddling the free end of the plate and normally spaced therefrom, and means operable upon a predetermined speed of the vehicle to energize the solenoid and move a leg of the U-shaped portion of the core into locking engagement with the plate.

6. In a motor vehicle, the combination of an intake manifold, a throttle valve controlling the admission of fuel to the engine, an accelerator pedal, operating mechanism for transmitting movement from the accelerator pedal to the valve, pedal locking means including a plate and a solenoid having a movable core associated with said plate, one of said last-mentioned elements being carried by said operating mechanism, and means operable upon a predetermined speed of the vehicle to energize the solenoid and move the core into locking engagement with the plate.

7. In a motor vehicle, the combination of an intake manifold, a throttle valve controlling the admission of fuel to the engine, an accelerator pedal, operating mechanism for transmitting movement from the accelerator pedal to the valve including a rock shaft having one end connected to the pedal and the other end connected to the throttle valve, pedal locking means including a plate and a solenoid having a movable core associated with said plate, one of said last-mentioned elements being mounted on said rock shaft, and means operable upon a predetermined speed of the vehicle to energize the solenoid and move the core into locking engagement with the plate.

8. In a motor vehicle, the combination of an intake manifold, a throttle valve controlling the admission of fuel to the engine, an accelerator pedal, operating mechanism for transmitting movement from the accelerator pedal to the valve including a rock shaft having one end connected to the pedal and the other end connected to the throttle valve, pedal locking means including a plate mounted on the rock shaft to move therewith and a solenoid having a core located in the path of the pate, and means operable upon a predetermined speed of the vehicle to energize the solenoid and move the core into locking engagement with the plate.

9. In a motor vehicle, the combination of an intake manifold, a throttle valve controlling the admission of fuel to the engine, an accelerator pedal, operating mechanism for transmitting movement from the accelerator pedal to the valve including a rock shaft connected to the pedal and having an arm connected to the throttle valve, a segmental plate mounted on said arm and movable therewith, a solenoid having a core located in the path of said plate, and means operable upon a predetermined speed of the vehicle to energize the solenoid and move the core into locking engagement with the plate.

10. In a motor vehicle, the combination of an intake manifold, a throttle valve controlling the admission of fuel to the engine, an accelerator pedal mounted on the floor board of the vehicle, operating mechanism for transmitting movement from the accelerator pedal to the valve including a rock shaft mounted beneath the floor board adjacent the pedal and operatively connected to the pedal, said rock shaft having an arm connected to the throttle valve, a segmental plate mounted on said arm and movable therewith, a solenoid having a core located in the path of said plate, and means operable upon a predetermined speed of the vehicle to energize the solenoid and move the core into locking engagement with the plate.

11. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, said device comprising pedal locking means including a plate and an element associated with said plate, one of said last-mentioned members being carried by said operating mechanism, and means operable upon a predetermined speed of the vehicle to move said element into locking engagement with the plate, whereby the accelerator pedal is positively locked against movement for further opening of the throttle valve until the speed of the vehicle has decreased.

12. A speed control device for motor vehicles wherein the motor vehicle is provided with an intake manifold having a throttle valve controlling the admission of fuel to the engine, an accelerator pedal, and operating mechanism for transmitting movement from the accelerator pedal to the valve, said device comprising pedal locking means including a plate carried by said operating mechanism and an element located in the path of the plate, and means operable upon a predetermined speed of the vehicle to move said element into locking engagement with the plate, whereby the accelerator pedal is positively locked against movement for further opening of the throttle valve until the speed of the vehicle has decreased.

JAMES REYNOLDS McCOY.